(12) United States Patent  (10) Patent No.: US 9,145,101 B2
Gillay  (45) Date of Patent: Sep. 29, 2015

(54) GARNISH STRUCTURE WITH INTEGRATED TETHER STRAP

(71) Applicant: Toyota Motor Engineering & Manufacturing North America, Inc., Erlanger, KY (US)

(72) Inventor: Daniel F. Gillay, Plymouth, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 36 days.

(21) Appl. No.: 14/077,803

(22) Filed: Nov. 12, 2013

(65) Prior Publication Data

US 2015/0130174 A1  May 14, 2015

(51) Int. Cl.
*B60R 21/214* (2011.01)
*B60R 21/216* (2011.01)
*B60R 21/2338* (2011.01)

(52) U.S. Cl.
CPC ............. *B60R 21/216* (2013.01); *B60R 21/214* (2013.01); *B60R 21/2338* (2013.01)

(58) Field of Classification Search
CPC .... B60R 21/20; B60R 21/213; B60R 21/214; B60R 13/02; B60R 13/0212; B60R 13/0231
USPC ............................. 280/728.2, 730.2; 296/1.08
See application file for complete search history.

(56) References Cited

U.S. PATENT DOCUMENTS

| | | | | |
|---|---|---|---|---|
| 5,342,126 | A * | 8/1994 | Heston et al. | 374/208 |
| 6,145,870 | A * | 11/2000 | Devane et al. | 280/728.2 |
| 7,077,449 | B2 * | 7/2006 | Tokunaga | 296/39.1 |
| 7,585,009 | B2 | 9/2009 | Longwell et al. | |
| 7,976,056 | B2 * | 7/2011 | Kirchen et al. | 280/728.2 |
| 8,317,221 | B2 | 11/2012 | Hemingway | |
| 8,641,137 | B2 * | 2/2014 | Lizak | 296/214 |
| 8,769,778 | B2 * | 7/2014 | Kim et al. | 24/289 |
| 2003/0146606 | A1 * | 8/2003 | Hanjono | 280/730.2 |
| 2007/0075531 | A1 * | 4/2007 | Tsuge | 280/730.2 |
| 2007/0176400 | A1 * | 8/2007 | Kamano | 280/730.2 |
| 2011/0133434 | A1 * | 6/2011 | Kirchen et al. | 280/728.2 |
| 2012/0313354 | A1 * | 12/2012 | Ochiai et al. | 280/728.2 |
| 2013/0168515 | A1 | 7/2013 | Yamamoto | |
| 2013/0249230 | A1 * | 9/2013 | Gillay et al. | 296/1.08 |
| 2013/0278001 | A1 * | 10/2013 | Zimmerman et al. | 296/1.08 |

* cited by examiner

*Primary Examiner* — James English
(74) *Attorney, Agent, or Firm* — Gifford, Krass, Sprinkle, Anderson & Citkowski, P.C.

(57) ABSTRACT

The present invention relates to the securing of a garnish in a vehicle. The garnish is disposed over the airbag and secures to one or more apertures in the vehicle. The garnish includes a cover, which hides the airbag before it is deployed. A tether is attached to the cover. The tether extends from the cover, and includes a flexible securing portion which is received in the vehicle aperture. When the airbag deploys, the garnish is displaced. Displacement of the garnish, and deployment of the airbag, is enabled by the flexible securing portion, which deforms in response to the airbag, thereby allowing deployment while maintaining attachment of the cover to the vehicle.

14 Claims, 6 Drawing Sheets

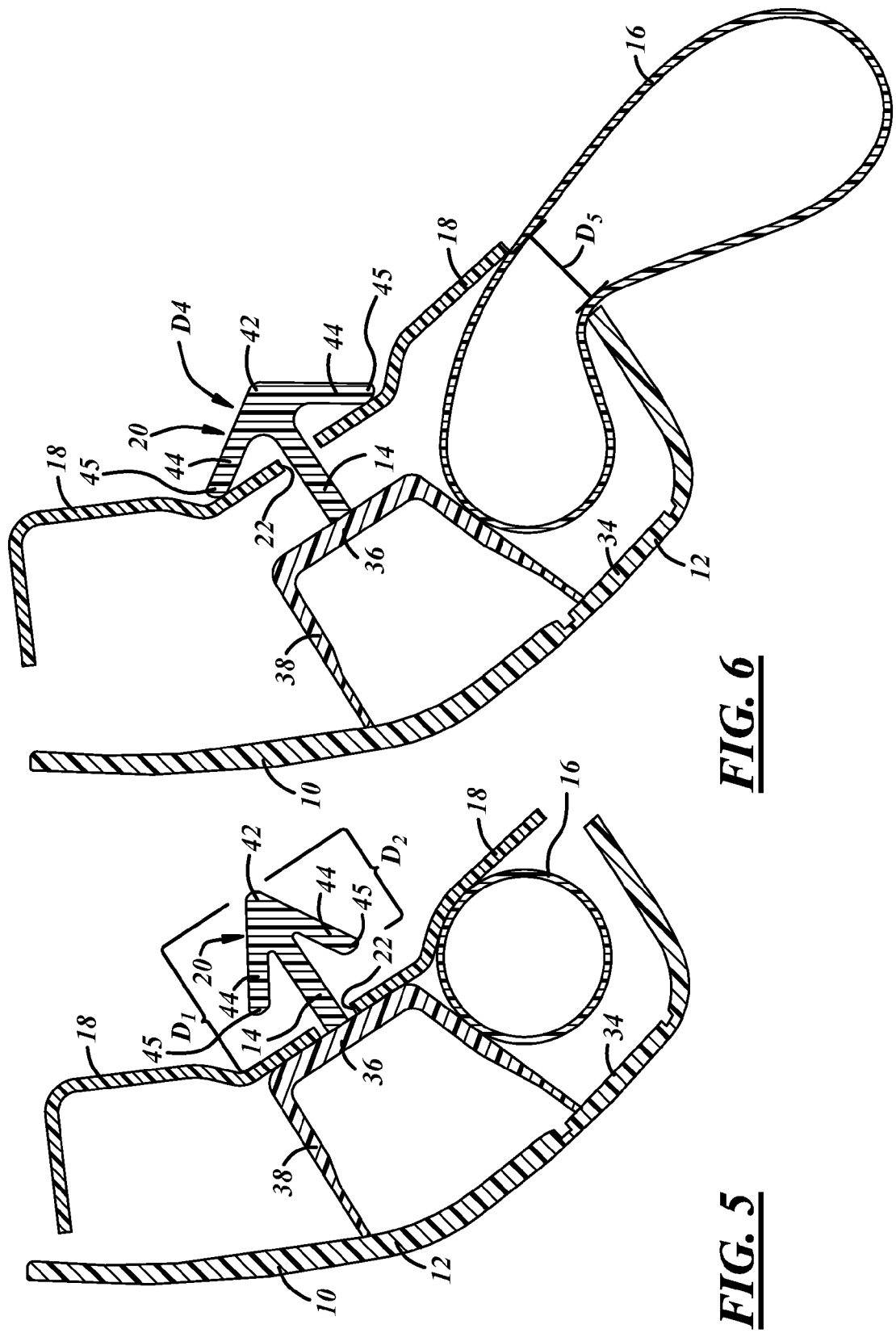

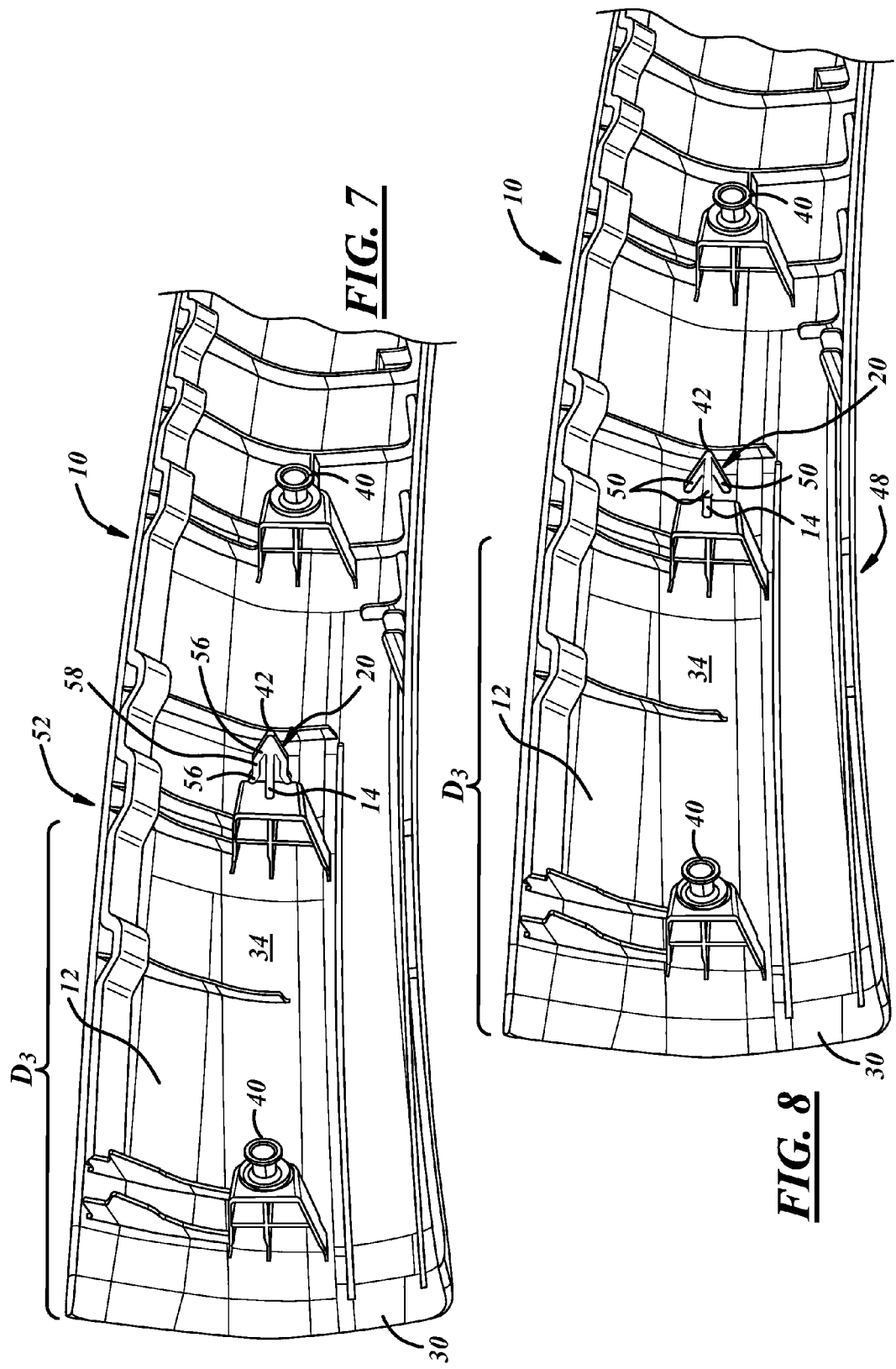

GARNISH STRUCTURE WITH INTEGRATED TETHER STRAP

FIELD OF THE INVENTION

The present invention relates to the securing of a garnish in a vehicle. Specifically, securing a garnish covering an airbag, and allowing controlled movement of the garnish when the airbag is deployed.

BACKGROUND OF THE INVENTION

Utilizing a garnish to cover an airbag in a vehicle has been practiced since the first airbags were installed. These first airbags were designed for a frontal impact and located within a steering wheel. They were covered by a rubber like garnish material. This material had thinned areas that were designed to tear in certain areas to allow the airbag to deploy while maintaining control and attachment of the garnish to the steering wheel.

As the benefit of airbags became apparent, they were included in numerous other areas of the vehicle, such as frontal impact airbags in the passenger side dashboard, side curtain impact airbags in the roof line and pillars, etc. As the locations and designs for the airbags increased in complexity, so too did the design of the garnishes and garnish attachments.

Consumers prefer a harder material for garnishment of the pillars as compared to the steering wheel. This harder plastic could not be designed to tear in specific locations, rather it would have to be displaced when the airbags deployed. In order for the displaced garnish to not get in the way when the airbag deployed, movement of the garnish needed to be controlled.

Allowing displacement while maintaining control of the garnish has traditionally been achieved through complicated two-stage clips or fasteners. These clips would initially secure the garnish to the vehicle, and upon the application of a threshold amount of force, the first stage of the clip would break free, and the second stage of the clip would engage, allowing a certain amount of travel between the first and second stage. These clips were able to adequately secure the garnish and allow the necessary movement and control, however their complex design made them costly to implement.

Based on the problems described above, a new airbag garnish and attachment design is desired.

SUMMARY OF THE INVENTION

The present invention is for a garnish covering a vehicle airbag. The garnish is disposed over the airbag and secures to one or more apertures in a vehicle. The garnish includes a cover, which hides the airbag from the view of a passenger in the vehicle before the airbag is deployed. A tether is attached to the cover. The tether extends from the cover, and includes a flexible securing portion which is received in the vehicle aperture.

When the airbag is deployed, the garnish is displaced from its initial position to allow space for the airbag to expand as it deploys. When the garnish is displaced in response to the airbag deployment, the flexible securing portion is drawn to abut the vehicle near the aperture. Upon abutment, and in response to the airbag deployment, the flexible securing portion deforms, thereby maintaining attachment of the cover.

Further, as the airbag deploys, the flexible securing portion flexes in response to the deployment. This flex allows controlled movement of the garnish relative to the aperture in which the flexible securing portion is received.

Other features and advantages of the present invention will become apparent from the following detailed description of a preferred embodiment, as well as other embodiments, with reference to the accompanying drawings.

BRIEF DESCRIPTION OF THE DRAWINGS

To complement this description and in order to aid in a better understanding of the invention's characteristics, a set of illustrative and non-limiting drawings is included as follows:

FIG. 5 shows a cross sectional view of the embodiment secured to the vehicle before airbag deployment;

FIG. 6 shows a cross sectional view of the embodiment secured to the vehicle after airbag deployment;

FIG. 7 shows the back side of an alternate embodiment of a garnish cover for the pillar of the vehicle; and FIG. 8 shows the back side of another alternate embodiment of a garnish cover for the pillar of the vehicle.

DETAILED DESCRIPTION OF THE PREFERRED EMBODIMENTS

Figure 1:
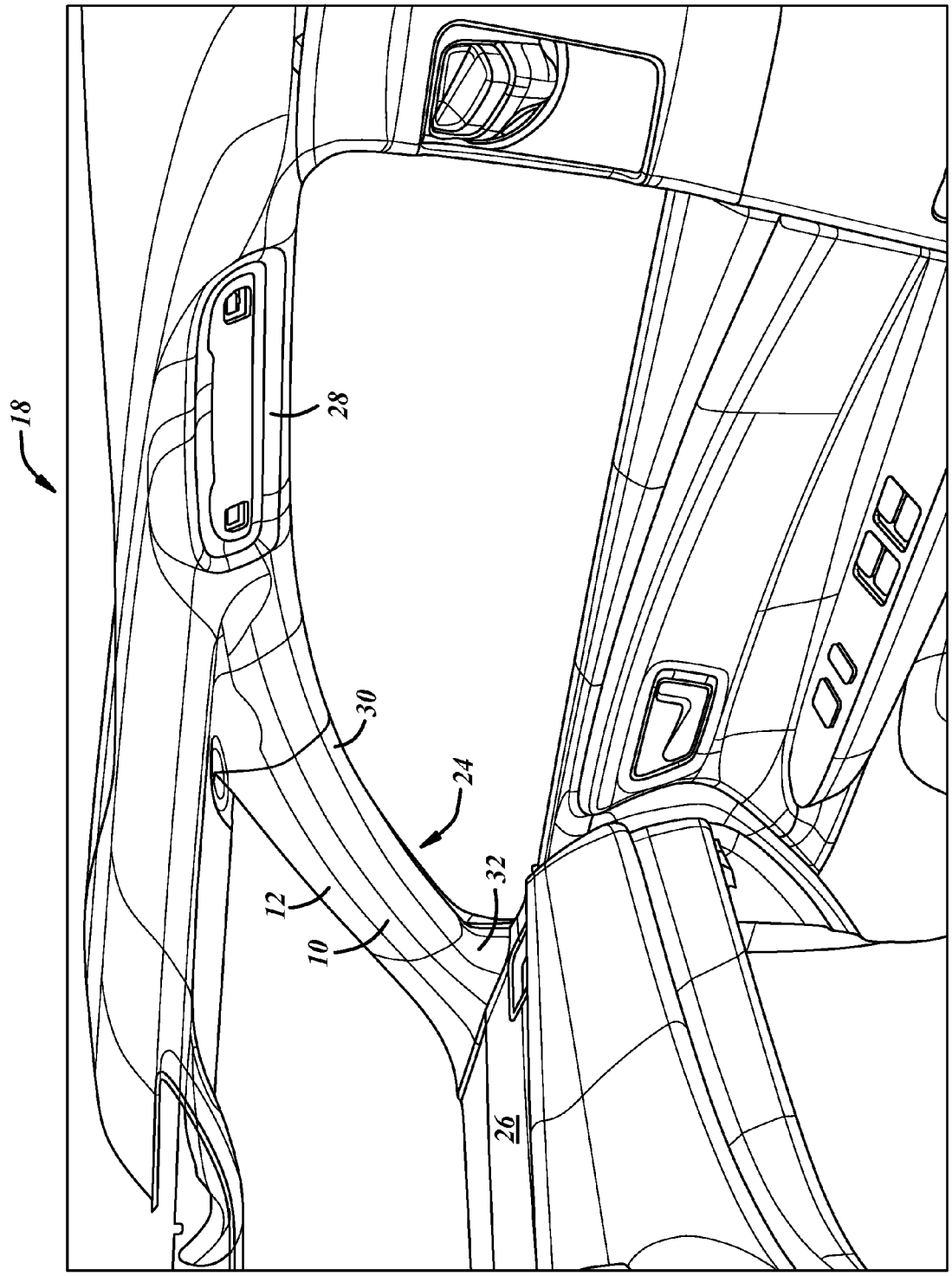
FIG. 1 shows a perspective view of an interior of a vehicle.

An airbag garnish 10 of the present invention includes a cover 12 and a tether 14. The cover 12 is disposed over an airbag 16 of a vehicle 18. The cover 12 is secured to the vehicle 18 by a flexible securing portion 20 of the tether 14, which is received in an aperture 22 of the vehicle 18. When the airbag 16 deploys, the garnish 10 is displaced. Controlled displacement of the garnish 10 during deployment of the airbag 16, is enabled by the flexible securing portion 20, which deforms in response to the airbag 16, thereby allowing deployment while maintaining attachment of the cover 12 to the vehicle 18.

Figure 2:
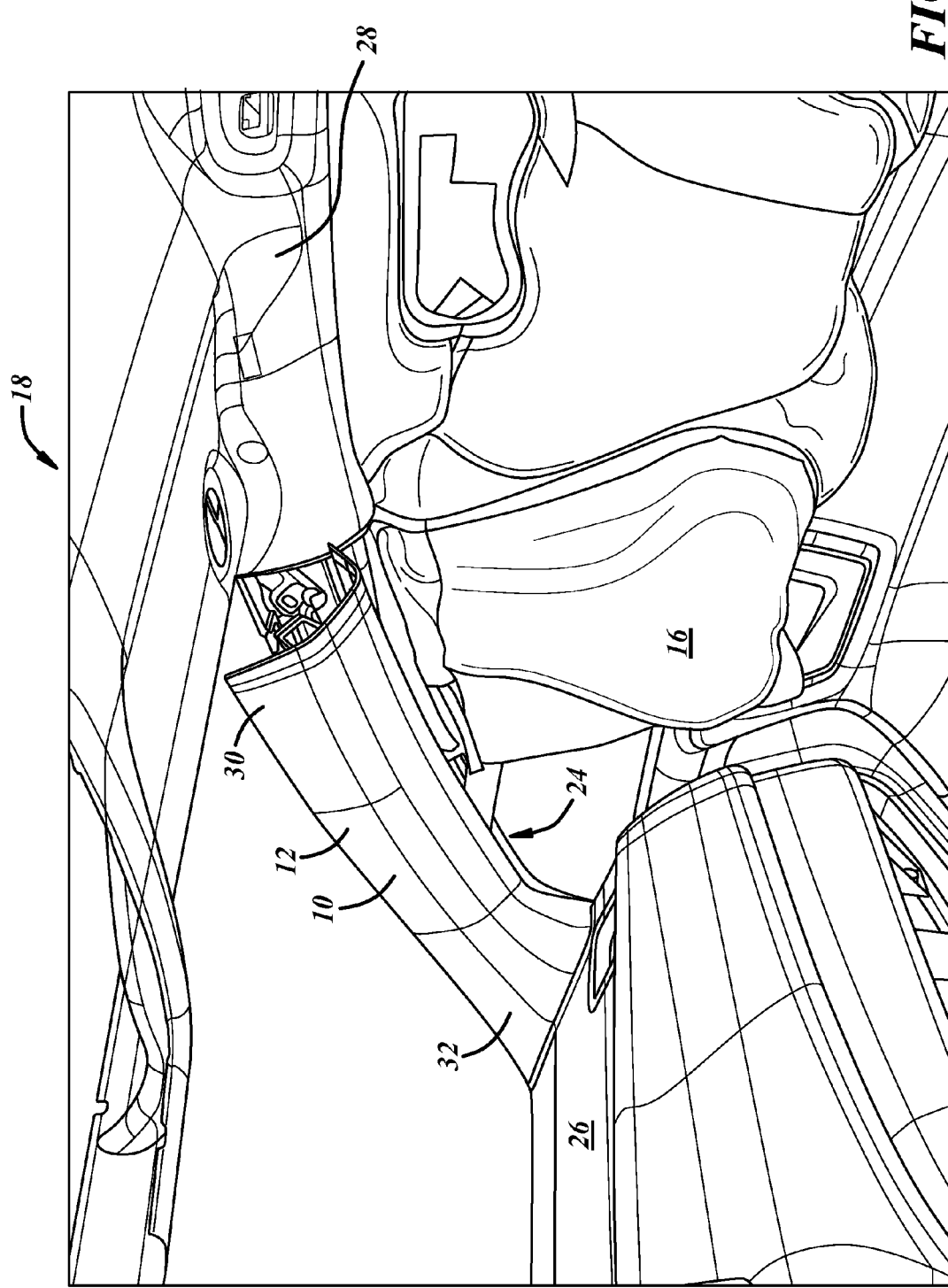
FIG. 2 shows a perspective view of the interior of the vehicle of FIG. 1 with a deployed airbag.

With reference now to FIGS. 1 and 2, an interior of the vehicle 18 is shown. The garnish 10 extends along the A-pillar 24 of the vehicle 18 between a dashboard 26 and roofline 28 of the vehicle 18. In FIG. 1, only the cover 12 of the garnish 10 is visible, as the tether 14 and the airbag 16 are hidden from view. FIG. 2 shows the airbag 16 in a deployed state, the cover 12 having been displaced from its original position, as shown in FIG. 1, to allow space for the airbag 16 to deploy. In being displaced, a first end 30 of the cover 12, located near the roofline 28, has a much larger displacement than a second end 32 of the cover 12 located near the dashboard 26, which is hardly displaced at all.

Figure 3:
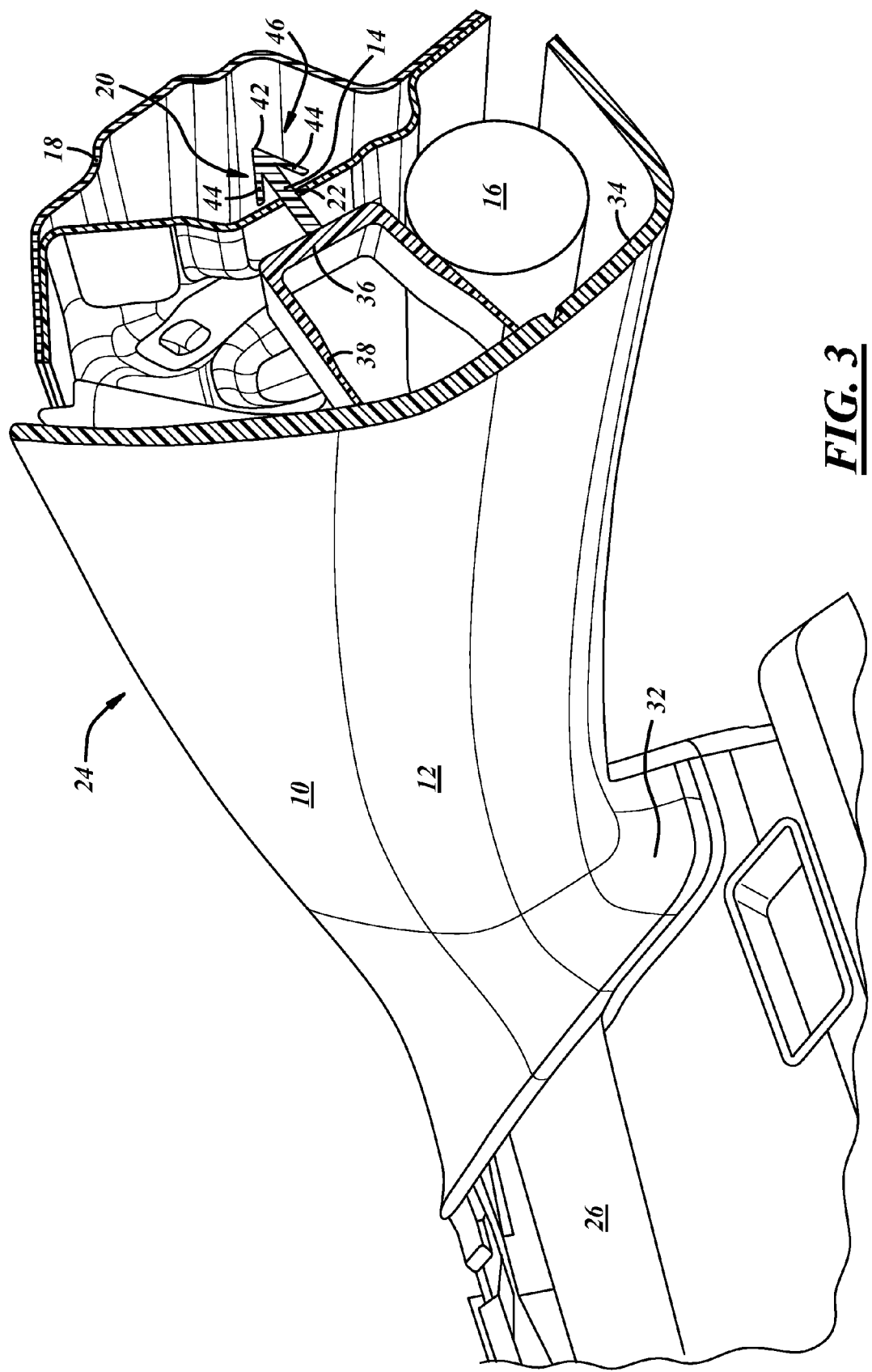
FIG. 3 shows a perspective view of the interior of the vehicle of FIG. 1 including a cross section of a pillar of the vehicle.
Figure 4:
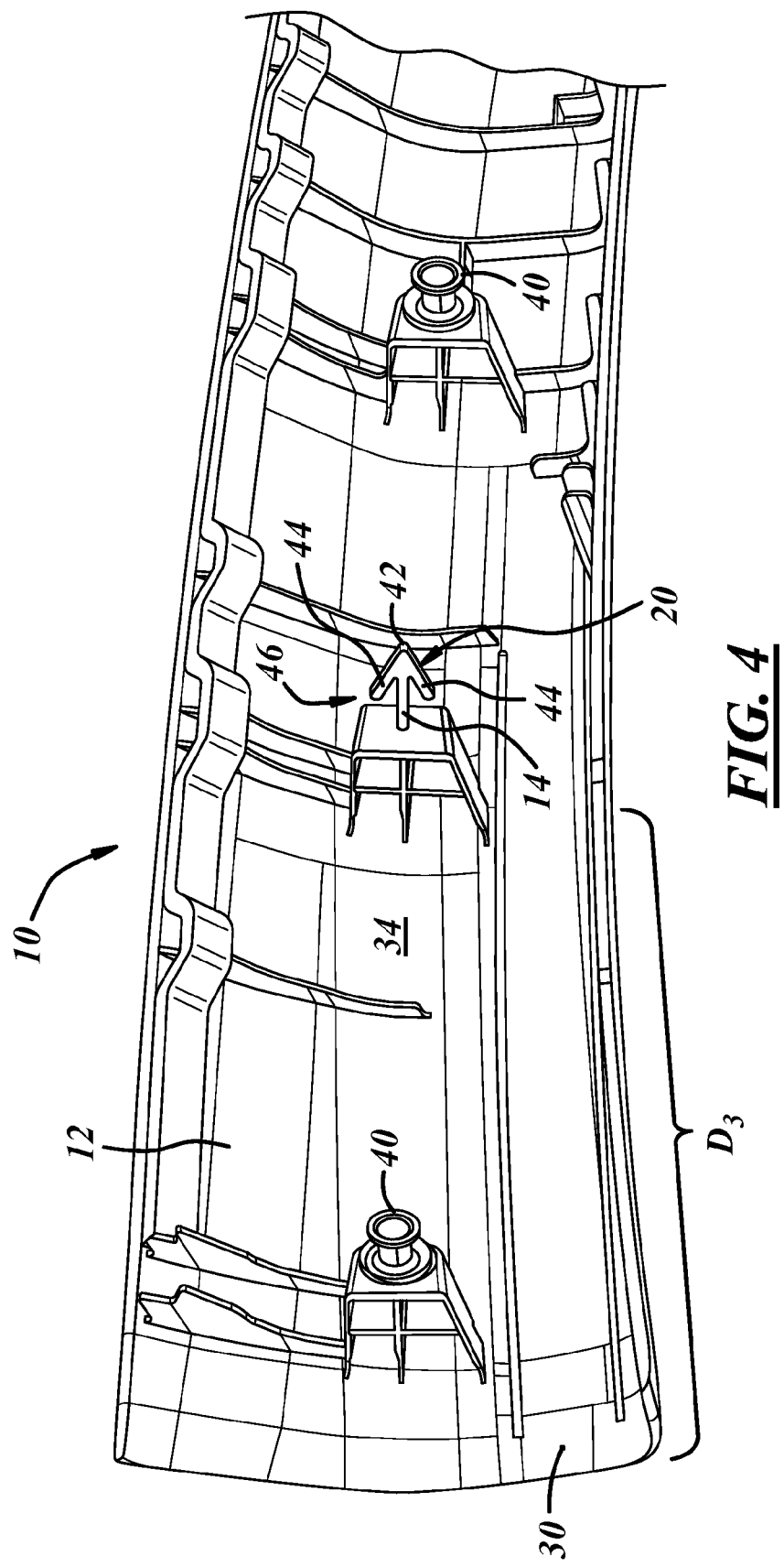
FIG. 4 shows the back side of one embodiment of a garnish cover for the pillar of the vehicle.

FIG. 3 shows a cross section of the preferred embodiment of the garnish 10 attached to the vehicle 18 before the airbag 16 is deployed. The tether 14 is located on a backside 34 of the cover 12. The tether 14 extends generally perpendicularly from a top 36 of a base 38 which is attached to the backside 34 of the cover 12. The tether 14 is disposed along the backside 34 of the cover 12 between a pair of standard clips 40, as can be seen in FIG. 4. The standard clips 40 help to hold the cover 12 in place before the airbag 16 is deployed, however, upon deployment, the standard clips 40 cease to provide any attachment between the cover 12 and the vehicle 18. In the preferred embodiment, the cover 12, base 38 and tether 14 are all integrally molded in a single piece from plastic using injection mold methods known to those skilled in the art.

With reference to FIG. 5, when the tether 14 is installed to the vehicle 18, the tether 14 extends though the aperture 22 in the vehicle 18. Located at a distal end 42 of the tether 14, and disposed on an opposite side of the aperture 22 as compared to the cover 12, is the flexible securing portion 20. The flexible securing portion 20 is designed such that it can pass through the aperture 22 in one direction, thereby enabling the garnish 10 to be installed onto the vehicle 18. The flexible securing portion 20 is designed such that it cannot pass though the aperture 22 in a removal direction. FIG. 5 shows ends 45 of the flexible securing portion 20 in a first position.

For example, as shown in FIG. 6, when the airbag 16 is deployed, the cover 12 is urged outward, and the flexible securing portion 20 is drawn towards the aperture 22. The flexible securing portion 20 abuts the vehicle 18 near the aperture 22. In response to airbag 16 deployment, the flexible securing portion 20 does not pass back through the aperture 22; rather the flexible securing portion 20 deforms to maintain attachment of the cover 12 to the vehicle 18. FIG. 6 shows the ends 45 of the flexible securing portion 20 in a second position. The ends 45 are further apart in the second position as compared to the first position.

The deformation and flexing of the flexible securing portion 20 allows increased displacement, as the garnish 10 continues to travel away from the vehicle 18 as the flexible securing portion 20 flexes and deforms. Further, flexing and deforming provides a controlled dampened movement to the garnish 10 as it reaches the end of its available displacement length. Dampening reduces the shock load placed on the tether 14, thereby creating a more robust part.

The flexible securing portion 20 of one embodiment includes at least two extensions 44. The at least two extensions 44 start at the distal end 42 of the tether 14 and extend back towards the cover 12, giving a generally arrow like shape 46 to the tether 14 and flexible securing portion 20. The extensions 44 include the ends 45 of the flexible securing portion 20. The at least two extensions 44 are generally 180 degrees from each other when an axis of the tether 14 is used as a center point. The design of this embodiment is not meant to be limiting, as other designs of the flexible securing portion 20 will be apparent to those skilled in the art in light of the teachings herein, for example the embodiments of the flexible securing portion 20 shown in FIGS. 7 and 8.

An alternative embodiment 48 of the flexible securing portion 20 includes more than two extensions 50. The more than two extensions 50 start at the distal end 42 of the tether 14 and extend back towards the cover 12. In the embodiment shown in FIG. 8, the more than two extensions 50 include four extensions 50, spaced about 90 degrees from each other when the axis of the tether 14 is used as a center point.

Another alternative embodiment 52 of the flexible securing portion 20 includes at least two alternate extensions 54. The alternate extensions 54 start at the distal end 42 of the tether 14, and extend back toward the cover 12. The each of alternate extensions 54 includes at least one portion 56 that is angled away from the tether 14 and at least one portion 58 that is generally parallel to the tether 14. The alternate extensions 54 shown in FIG. 7 each include one generally parallel portion 58 disposed between two angled away portions 56. The shown alternate embodiment 52 has two alternate extensions 54, which are generally 180 degrees from each other when the axis of the tether 14 is used as a center point.

The tether 14 and flexible securing portion 20 can have predetermined lengths D1, D2. The predetermined length D1 of the tether 14 and the predetermined length D2 of the flexible securing portion 20 can be determined based on the distance D3 between the tether 14 and the end of the cover 12, on the amount of flex available in the securing portion D4, or on the amount of displacement required D5 of the cover 12 when the airbag 16 deploys.

As discussed above, when the airbag 16 deploys, the first end 30 of the cover 12 is forced away from the vehicle 18 and the second end 32 of the cover 12 remains relatively stationary. In one aspect, the cover 12 bends and flexes providing a pivotal type movement about the second end 32. The motion of the cover 12 is restricted by the tether 14, which is secured to the cover 12 and to the vehicle 18. Restricting the motion is controlled by either adjusting the predetermined length D1 of the tether 14 or the predetermined length D2 of the flexible securing portion 20.

One way to determine the predetermined lengths D1, D2 is by relating them to the distance D3 between the tether 14 and the first end 30 of the cover 12. As previously described, the cover 12 moves in a pivotal motion. For any given length, the motion of the cover 12 will be decreased the closer the tether 14 is moved to the first end 30. For example if the tether 14 needs to be located at a certain position along the cover 12, a longer tether 14 would be needed to produce the same control as a shorter tether 14 located further from the first end 30.

The amount of flex available D4 in the flexible securing portion 20 can also be used to determine the predetermined lengths D1, D2. If the amount of flex available in the flexible securing portion 20 is low, a longer flexible securing portion 20 would be required to provide the same dampening and movement control characteristics as compared to a shorter length of more flexible material.

Finally, the predetermined lengths can be determined based on the amount of displacement required D5 of the cover 12 when the airbag 16 deploys. If larger displacement is required, a longer tether 14 and shorter flexible securing portion 20 can be used, and vise-versa.

The tether 14 can also be located at a predetermined length D3 from the end of the first end 30 of the cover 12. The greater the predetermined length D3, the greater the movement of the first end 30 of the cover 12 when the airbag 16 deploys. The predetermined length D3 can be determined by the length D1 of the tether 14, by the length D2 of the flexible securing portion 20, by the amount of flex available D4 in the flexible securing portion 20, or by the displacement required D5 of the cover 12 when the airbag 16 deploys. Determination based on these criteria is similar to the determination of the predetermined lengths D1, D2 as discussed above.

The garnish 10 can be integrally molded from plastic as a single unit using injection molding. Based on the above teachings, other materials and manufacturing methods known to those skilled in the art can be used to produce the garnish 10.

Obviously, many modifications and variations of the present invention are possible in light of the above teachings and may be practiced otherwise then as specifically described while within the scope of the appended claims.

The invention claimed is:

1. An airbag garnish to be secured to a vehicle having an aperture and an airbag, the garnish comprising:
   a cover,
   a tether attached to the cover, the tether including a flexible securing portion received in the vehicle aperture; and
   the flexible securing portion includes a plurality of extensions, the extensions starting at a distal end of the tether and extending back towards the cover to give a generally arrow like shape to the tether and flexible securing portions, the extensions each having an end; the end of each extension movable from a first position to a second position, the ends of the extensions being further apart in the second position than the first position;

wherein the flexible securing portion deforms with the ends of the extensions moving from the first position to the second position in response to an airbag deployment allowing deployment of the airbag and maintaining attachment of the cover to the vehicle aperture.

2. The garnish of claim 1 wherein the flexible securing portion includes more than two extensions, the extensions starting at a distal end of the tether, and extending back towards the cover.

3. The garnish of claim 1 wherein the flexible securing portion includes at least two extensions, the extensions starting at a distal end of the tether, and extending back towards the cover, the extensions each including at least one portion that is angled away from the tether and at least one portion that is generally parallel to the tether.

4. The garnish of claim 1 wherein the cover includes a base disposed on the cover, the tether extending from a top of the base.

5. The garnish of claim 1 wherein the tether and the flexible securing portion have a predetermined length, D1 and D2 respectively.

6. The garnish of claim 5 wherein the predetermined lengths are determined by the distance between the tether and an end of the cover.

7. The garnish of claim 5 wherein the predetermined lengths are determined by the amount of flex available in the flexible securing portion.

8. The garnish of claim 5 wherein the predetermined length of the tether portion and the extension portion are determined by the amount of displacement required of the cover when the airbag deploys.

9. An airbag garnish to be secured to a vehicle having an aperture, the garnish comprising:

a cover, a tether attached to the cover, the tether including a flexible securing portion received in the vehicle aperture; and the flexible securing portion includes a plurality of extensions, the extensions starting at a distal end of the tether and extending back towards the cover to give a generally arrow like shape to the tether and flexible securing portions, the extensions having an end; the end of the extension movable from a first position to a second position, the ends of the extensions being further apart in the second position than the first position;

wherein the flexible securing portion flexes with the ends of the extensions moving from the first position to the second position in response to an airbag deployment thereby controlling movement of the garnish relative to the vehicle.

10. The garnish of claim 9 wherein the cover includes a base disposed on the cover, the tether extending generally perpendicularly from a top of the base.

11. The garnish of claim 9 wherein the tether is located at a predetermined length from an end of the cover, D3.

12. The garnish of claim 11 wherein the predetermined length is determined by a length of the tether.

13. The garnish of claim 11 wherein the predetermined length is determined by the amount of flex available in the flexible securing portion.

14. The garnish of claim 11 wherein the predetermined length is determined by an amount of displacement required of the cover when the airbag deploys.

* * * * *

UNITED STATES PATENT AND TRADEMARK OFFICE
CERTIFICATE OF CORRECTION

PATENT NO.        : 9,145,101 B2
APPLICATION NO.   : 14/077803
DATED             : September 29, 2015
INVENTOR(S)       : Daniel F. Gillay It is certified that error appears in the above-identified patent and that said Letters Patent is hereby corrected as shown below:

In the Specification

In column 3, Line 4, delete "though" and insert --through--, therefor.
In column 3, Line 12, delete "though" and insert --through--, therefor.
In column 4, Line 36, delete "vise-versa" and insert --vice-versa--, therefor.

Signed and Sealed this
Twenty-first Day of June, 2016

Michelle K. Lee
*Director of the United States Patent and Trademark Office*